Dec. 26, 1939.  C. E. VAN STONE ET AL  2,184,984

HIGH PRESSURE HOSE

Filed Aug. 12, 1938

Inventors,
C. E. Van Stone,
A. E. Johnson;
By their Attorney
Frederick E. Maynard Patented Dec. 26, 1939

2,184,984

UNITED STATES PATENT OFFICE 2,184,984

HIGH PRESSURE HOSE

Clifford E. Van Stone and Arthur E. Johnson, Taft, Calif.

Application August 12, 1938, Serial No. 224,478

2 Claims. (Cl. 285—85)

This invention is a high pressure, fluid hose assembly.

In the oil field industry a fluid is commonly circulated through a swivel-joint pipe line with quite high pressure and the point of attachment of the heavy duty rubber hose to a relative swivel connection of the pump line is subjected to much attrition and tensional reaction by the usual circulation mud, the viscosity of which induces the friction in the bore of the hose.

It has been the common practice to make up a hose end attachment to join the hose to the pump line or swivel end by use of a pair of complementary hose clamping sections squeezed onto the hose end by bolt or screw pressure to tighten and compress the hose end on an inserted nipple bushing. This type of hose clamp has not proved able to long withstand the heavy duty imposed by circulation pressure.

Therefore an object of the present invention is to provide an improved hose end and clamp and joint-nipple assembly whereby the compression of the hose end in the clamp is effected by a longitudinal instead of a transverse compacting force.

A further object of the invention is to provide hose end assembly of such construction and arrangements of elements that there is obtained a flow bore from bushing to hose that is of substantially unobstructed or uniform diameter.

A further object is to provide an originally enlarged hose end to present a normal shoulder to take the pull of the hose, away from the line joint, in a positive, effective and reliable manner instead of merely depending on the efficiency of the friction of the peripheral clamp sections of the common form of clamp to hold the hose end on the clamp bushing.

An additional object of the invention is to provide a clamp device of few and rugged parts which may be readily assembled in the field, and in which the bushing, the part most subjected to wear, may be easily replaced when renewals are needed.

The invention consists in certain advancements in this art as set forth in the ensuing disclosure and having, with the above, additional objects and advantages as hereinafter developed, and whose construction, combinations and details of means, and the manner of operation will be made manifest in the description of the herewith illustrative embodiment; it being understood that modifications, variations and adaptations may be resorted to within the scope, principle and spirit of the invention as it is more directly claimed hereinbelow.

Figure 1:
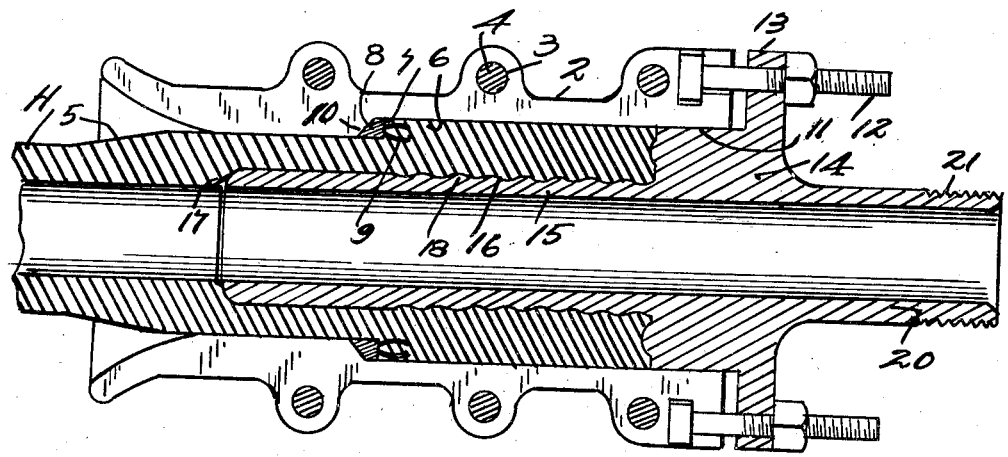
Figure 1 is an axial section of one form of the assembly, showing the clamp head with an integral nipple and bushing.
Figure 2:
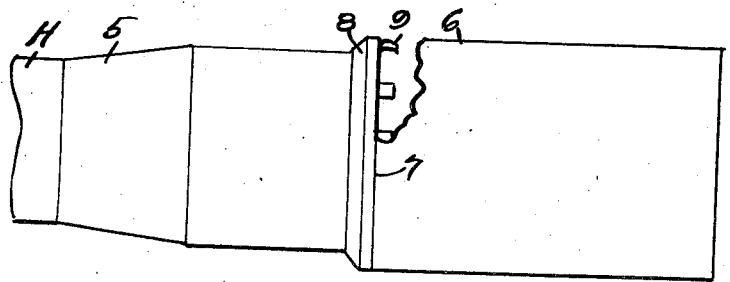
Figure 2 is a broken-away, side elevation of the hose end per se.

The assembly of Fig. 1 includes a pair of external, semicylindrical, elongate, duplicate, hose end fitting shell sections 2 of which the meeting or diametrical face of one only is shown in elevation in Fig. 1, the sections being provided with transverse holes 3 for reception of bolts 4 whereby they are set positively together about the interposed end of a respective hose H.

The hose is conically swelled or thickened at 5 to fit the adjacent, outwardly flared end of the shell 2 and is further much thickened at 6 to form a substantial, annular shoulder 7 and this shoulder is protected by an abutment ring 8 which is anchored to the face of the shoulder 7 by substantial prongs 9 extending into and vulcanized in the thickness 6 of the hose end.

The abutment ring 8 sets solidly against the near shoulder 10 formed by the enlarged bore 11 of the shell 2 which snugly fits the molded hose enlargement or body end 6 of the hose. This construction and arrangement of hose body and shell in itself affords a highly satisfactory means to resist pulling-out reaction of the high pressure fluid in circulation and obviously greatly reduces the need of the usual clamping action merely to hold against pull-out of the hose.

Extending from the outer end of the shell 2 is a set of parallel, fixed bolts 12 onto which may be passed an annular flange 13 integral with a substantial head or gland 14 snugly telescoping into the rear end of the shell 2 to be forced against the rear end of the hose body 6 in the shell. The gland head 14 is here shown as having an axial bushing or core part 15 snugly fitting the complementally enlarged bore 16 of the hose and which bore ends at a cross shoulder 17 which is located in the first thickened part 5 of the hose. For so much of its length as may be desired the bushing 15 is peripherally beaded, corrugated or otherwise roughened as at 18 to produce a key or interlock combination with the bore of the hose. Integral with the gland head 14 there is an axially extended nipple 20 threaded at 21 to receive a complementary joint part, not shown, in the pump or swivel line.

It will be seen that when the molded head or body 6 is enclosed by the relative shell 2 and this is cinched up by the section bolts 4 the hose end will be somewhat contracted onto the intruded bushing 15, and then when the gland head 14 is forced inward of the shell by setting up the bolt nuts 22, the head of rubber hose will be greatly compressed longitudinally between the shell shoulder 10 and the inner face of the gland head 14. This action does not effect a change in the bore of the hose at the inner end of the bushing 15 so that the bore of the flow passage in the bushing and hose remains of uniform diameter.

Figure 3:
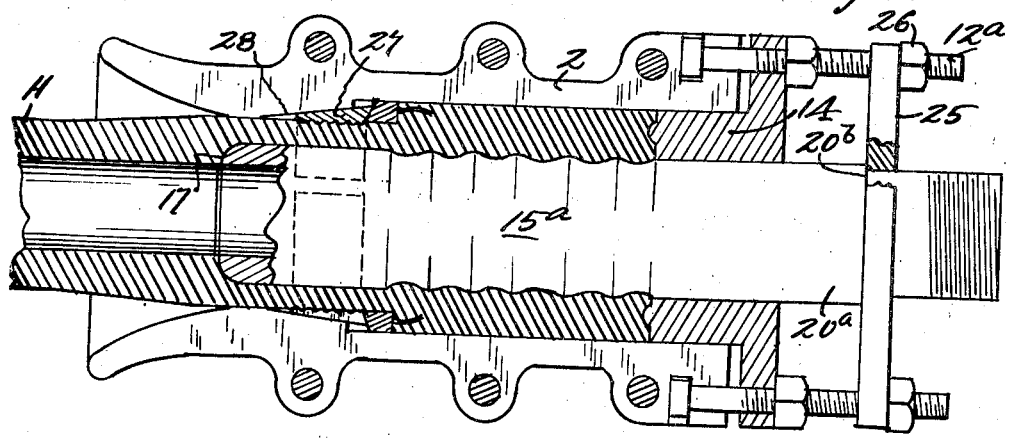
Figure 3 is an axial section of a modified form of the assembly showing the nipple-bushing part as separable from the clamp head or gland part, and showing slips for obtaining a high setting pressure on the hose in the clamp.

In the form of the invention shown in Fig. 3, the nipple 20a is formed as a separate and removable part axially fitting in the bored gland head 14 and is integrally joined with the bushing 15a. The nipple 20a has a transverse shoulder 20b and against this there is thrust a cross-head or spider 25 receiving the relative elongated bolts or screws 12a which extend well outward of the set-up gland head 14. By tightening up nuts 26 on the screws 12a the nipple-bushing 20a is forced inwardly to set its inner end hard against the near inner shoulder 17 in the bore of the hose.

In either type of the assembly there may be employed a set of segmental slips 27 of exteriorly conical form set in a complementary bore portion 28, as in Fig. 3 to be engaged by the near wear ring or abutment 8 which is anchored to the enlarged hose body part 6. By the contractive reaction of the compressed rubber body against the slips 27 these will exert a high clamping pressure on the adjacent portion of the hose.

What is claimed is:

1. A hose assembly including an elongate, longitudinally split shell and means to clamp the parts together on a hose end, the rear end of the shell having a reduced bore portion to fit the inserted part of the hose and the remaining forward portion of the shell having an elongate cylindrical bore for a complementary head part of the hose, a gland including a plug-like body telescoping in the larger, open end of the bore of the shell and having a bushing projecting rearwardly from the said plug body to lie in the smaller end of the bore and said bushing fitting the hose bore, and a connection between the gland and the shell whereby to ram the plug body along the shell bore and radially compress the end of the hose at the inner end of said body to the shell wall; the hose end being within the shell.

2. The hose device of claim 1, and the bushing slidably mounted in and projecting forwardly from the body.

CLIFFORD E. VAN STONE.
ARTHUR E. JOHNSON.